United States Patent
Gyger et al.

(10) Patent No.: US 7,581,873 B2
(45) Date of Patent: Sep. 1, 2009

(54) WATCH CRYSTAL HAVING AN OPTICAL EFFECT AND WATCH FITTED WITH SUCH A CRYSTAL

(75) Inventors: Thomas Gyger, Les Ponts-de-Martel (CH); Nakis Karapatis, La Neuveville (CH)

(73) Assignee: The Swatch Group Management Services AG, Biel (CH)

( * ) Notice: Subject to any disclaimer, the term of this patent is extended or adjusted under 35 U.S.C. 154(b) by 229 days.

(21) Appl. No.: 11/203,159

(22) Filed: Aug. 15, 2005

(65) Prior Publication Data

US 2006/0039244 A1 Feb. 23, 2006

(30) Foreign Application Priority Data

Aug. 13, 2004 (EP) .................. 04019277

(51) Int. Cl.
G04B 39/00 (2006.01)
G04B 19/04 (2006.01)

(52) U.S. Cl. .................... 368/296; 368/276; 368/238

(58) Field of Classification Search ........... 368/276, 368/47, 233, 238, 239, 234, 294, 296
See application file for complete search history.

(56) References Cited

U.S. PATENT DOCUMENTS

| | | | | |
|---|---|---|---|---|
| 2,290,278 A | * | 7/1942 | Failla | 368/234 |
| 2,723,527 A | * | 11/1955 | Smith | 368/233 |
| 3,566,602 A | * | 3/1971 | Bergey et al. | 368/79 |
| 4,017,157 A | | 4/1977 | van Riet | |
| 4,139,261 A | | 2/1979 | Hilsum | |
| 4,183,630 A | * | 1/1980 | Funada et al. | 349/159 |
| 6,282,152 B1 | * | 8/2001 | Kurple | 368/10 |
| 6,452,872 B1 | * | 9/2002 | Teijido et al. | 368/67 |
| 6,690,623 B1 | * | 2/2004 | Maano | 368/82 |
| 7,050,358 B2 | * | 5/2006 | Garay et al. | 368/67 |
| 2004/0022506 A1 | | 2/2004 | Arkas | |
| 2006/0251365 A1 | * | 11/2006 | Brewer | 385/116 |

FOREIGN PATENT DOCUMENTS

GB 1 579 088 11/1980
GB 2 058 384 A 4/1981

OTHER PUBLICATIONS

European Search Report in corresponding European patent application No. 04 01 9277, completed Dec. 16, 2004.

* cited by examiner

*Primary Examiner*—Renee S Luebke
*Assistant Examiner*—Sean Kayes
(74) *Attorney, Agent, or Firm*—Griffin & Szipl, P.C.

(57) ABSTRACT

The invention concerns a watch including a case fitted with a glass and containing display means able to be observed through the glass, characterised in that said glass is made from a plate formed of a fiber optic group.

19 Claims, 4 Drawing Sheets

WATCH CRYSTAL HAVING AN OPTICAL EFFECT AND WATCH FITTED WITH SUCH A CRYSTAL

This application claims priority from European Patent Application No. 04019277.5, filed Aug. 13, 2004, the entire disclosure of which is incorporated herein by reference.

FIELD OF THE INVENTION

The present invention generally concerns a portable instrument, in particular a watch, comprising a glass with an original optical effect. More specifically, the invention concerns a watch fitted with an optical effect glass improving the legibility of the information displayed by the watch display device while giving the watch a new and original aesthetic effect.

The present invention also concerns a watch glass with an original optical effect.

BACKGROUND OF THE INVENTION

FIG. 1 shows an example of a portable instrument of the prior art, in this case a wristwatch 1, fitted with an analogue display device 2, whereas FIG. 2 shows a watch of the prior art comprising a digital display device 4. For reasons of convenience, identical elements will be designated by the same reference numerals in the following description.

Display devices 2, 4 are protected from the external environment by a protective glass 6 made of synthetic or mineral glass or any other transparent material. This protective glass 6 is mounted on case 8 of the instrument such that its lower surface, which is opposite display device 2, 4, extends at a certain distance therefrom. As is clear from FIGS. 1 and 2, this method of mounting a protective glass on case 8 of a portable instrument is commonly used, whether the display device is of the analogue type 2, i.e. it comprises hands 10a, 10b moving above a dial 12 or of the digital type 4, i.e. it comprises a liquid crystal display cell in which a liquid crystal film is trapped between two substrates, provided on their opposing faces with a set of electrodes defining at their intersections a series of switchable segments for displaying information.

The use of protective glass 6 thus involves making the time information displayed by the display device appear to the wearer of the watch as though from a certain distance below the lower surface of the glass which, in a way, is detrimental to the aesthetic appearance of the watch.

Moreover, it is known that because of multiple light reflections which appear on the protective glass and on the top substrate of the cell in the case of a watch fitted with a digital liquid crystal type display device, the viewing angle at which the wearer can observe the displayed information decreases proportionally with the increase in the distance between the lower surface of the glass and the display device. The wearer of the watch is thus obliged to bend his wrist so that the face of the dial takes a substantially perpendicular position to his line of vision if he wishes to limit the effects of multiple reflections and observe the information displayed without interference. The parasitic reflections returned towards the observer are also undesirable in that they affect the contrast of the elements being observed through the glass.

Moreover, in the case of watches or instruments fitted with liquid crystal display device provided with a polarizer on the top substrate, the effect of the latter is lost when the device is observed from too great a viewing angle typically greater than 45°, so that the unswitched display segments become visible, which is detrimental to the legibility of the displayed information.

Another conventional drawback of watches fitted with an analogue display device is that the wearer has to orient the watch dial face such that it is substantially perpendicular to his line of vision if he wishes to remove or limit parallax error upon reading the analogue display.

It is an object of the present invention to overcome the aforementioned drawbacks in addition to others by providing a portable instrument such as a watch for improving reading comfort of the information provided by the analogue or digital display device, whatever the angle at which the display device is observed by the wearer of the watch.

It is also an object of the present invention to provide a portable instrument such as a watch for displaying information with improved contrast.

It is also an object of the present invention to produce a portable instrument such as a watch having new and original aesthetic effects in a simple and inexpensive manner.

SUMMARY OF THE INVENTION

The present invention thus concerns an electronic or mechanical watch comprising a case fitted with a glass and containing display means able to be observed through the glass, characterized in that said glass is made from a plate formed of a fibre optic group.

The use of the plate formed of a fibre optic group thus allows information displayed by the display means to be projected to the top surface of the plate forming the watch glass, such that for the observer the information appears to be "printed" on the top surface of the glass, thereby removing the drawbacks linked to multiple reflections.

The use of such a plate also improves the general aesthetic appearance of the watch by concealing from the observer's view the space situated between the top surface of the display means and the bottom surface of glass, insofar as the top surface of the display means is projected onto the top surface of the glass. If the top surface of the glass is at substantially the same level as the surface of the bezel surrounding the glass, an impression of continuity can advantageously be obtained between the image projected by the display means and the bezel.

According to an advantageous embodiment of the watch according to the invention, the plate formed of a fibre optic group and forming the glass has a non plane outer surface, for example of spherical convex or cylindrical convex shape.

Owing to these features, watches with an original aesthetic appearance can easily be made. In particular, the wearer can be given the impression that the watch has a dial and hands, or more generally a display device, of non plane shape while using conventional type analogue or digital display devices.

BRIEF DESCRIPTION OF THE DRAWINGS

Other features and advantages of the present invention will appear more clearly upon reading the following description of example embodiments, said description being made in a non-limiting manner and with reference to the annexed drawings, in which.

DETAILED DESCRIPTION OF THE ILLUSTRATIVE EMBODIMENTS

The description of the invention will be made within the scope of an application to a timepiece such as a wristwatch. It goes without saying however that the invention is not limited to this application and that it could advantageously be used within the scope of any other application requiring the display of information using analogue or digital displays such as measuring instruments, portable telephones, etc.

Figure 1:
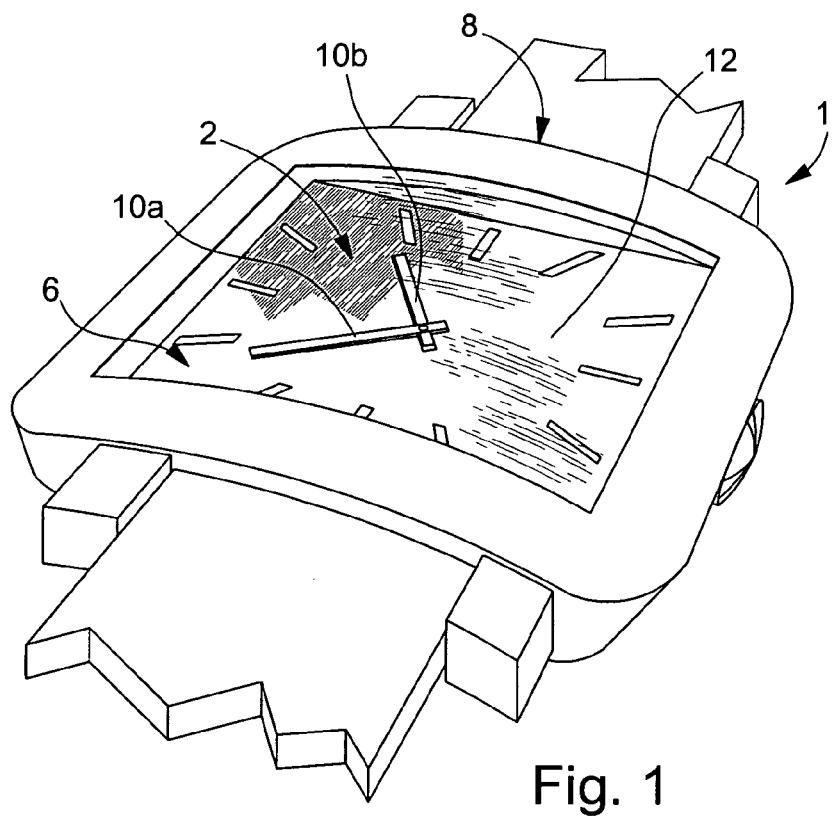
FIGS. 1 and 2, already described, show in perspective watches of the prior art respectively fitted with an analogue display device and a digital display device.
Figure 2:
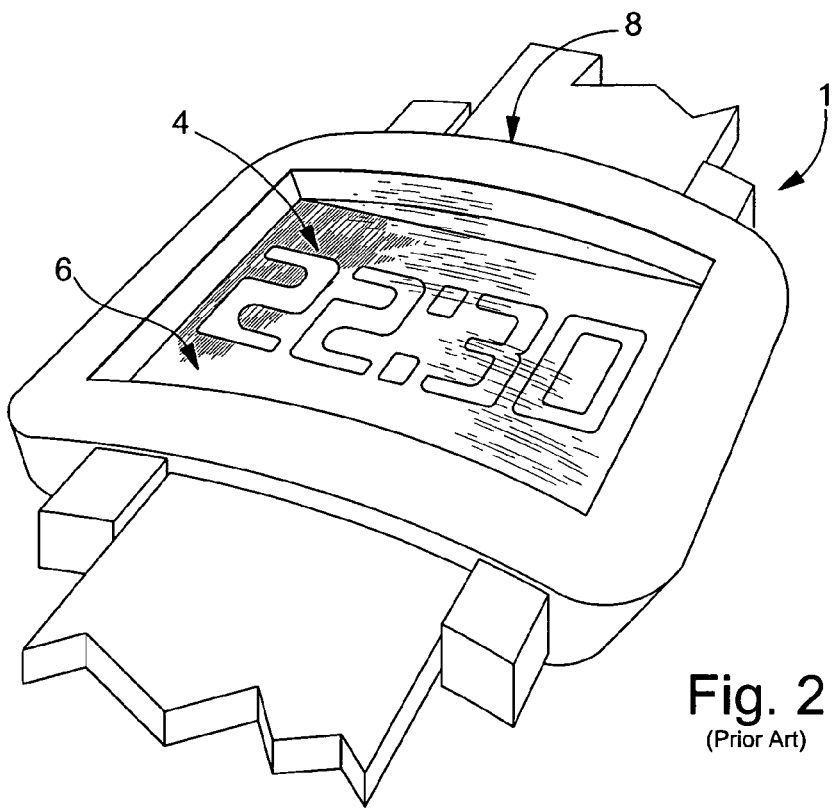
Figure 3:
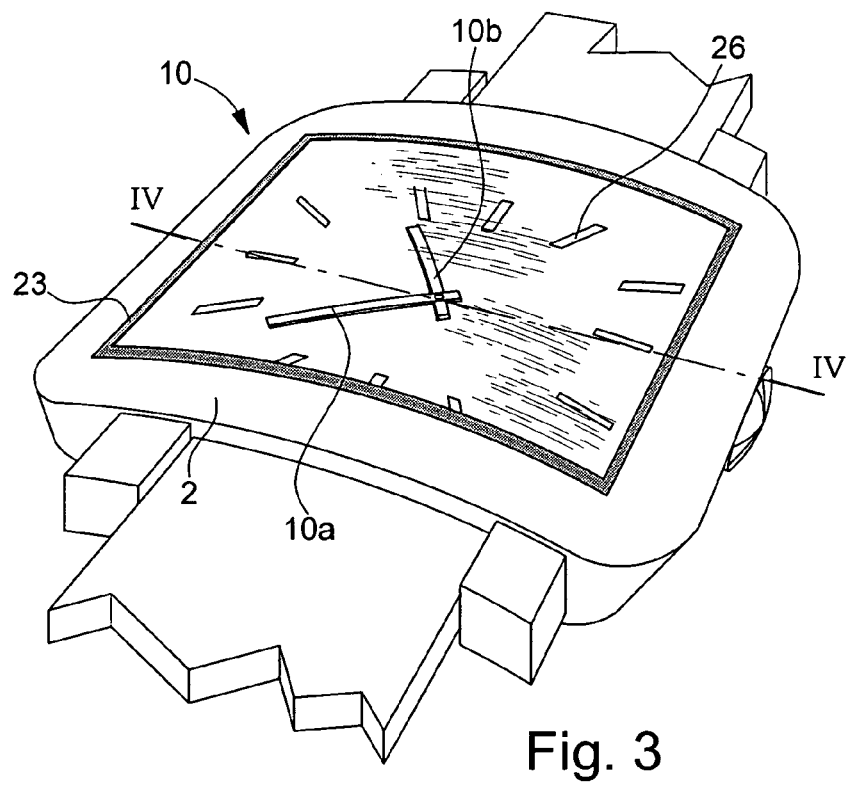
FIG. 3 shows in perspective a watch according to a first embodiment of the invention.
Figure 4:
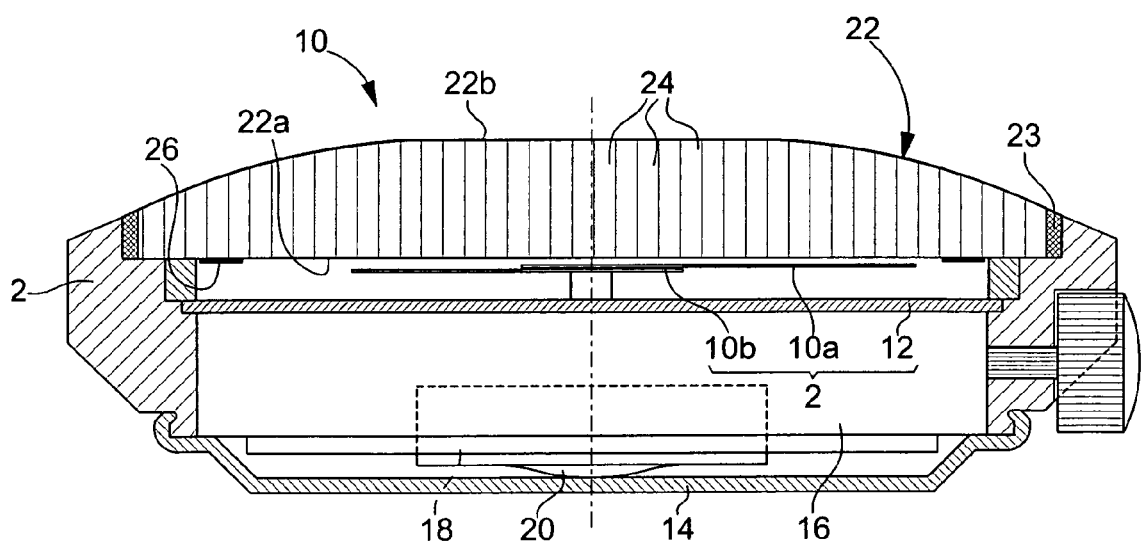
FIG. 4 shows a cross-section along the line IV-IV of the watch of FIG. 3.

Referring to FIGS. 3 and 4, a timepiece of the wristwatch type is shown according to a first embodiment of the invention designated by the general reference numeral 10. This watch 10 comprises in a conventional manner a case 8 provided with a back cover 14 in which there are arranged an electronic watch movement 16 and a battery 18 which rests on back cover 14 via a contact spring 20. Movement 16 comprises time-keeping circuits associated, via a control circuit, with a drive device (not shown) for a minute hand 10a and an hour hand 10b which move above a dial 12. Hands 10a and 10b and the dial together form an analogue display device 2. Case 8 is also closed by a protective glass 22 driven into the case via a sealing gasket 23, glass 22 covering, in the example illustrated, the whole of the surface of dial 12. Glass 22 has a bottom face 22a directed on the side of dial 12 and a top face 22b directed towards the exterior of watch 1. The glass could also be driven in without a sealing gasket. Bottom face 22a is plane and extends substantially parallel to display device 2 whereas its top face is of non plane shape, for example cylindrical convex. This construction is well known to those skilled in the art, thus there is no need to describe it in more detail.

According to the invention, glass 2 is made from a plate comprising a multitude of fibre optics 24 arranged parallel to each other to form a group. Fibre optics 24 are oriented in the plate forming glass 22 so as to be perpendicular to the bottom face 22a and consequently perpendicular to display device 2. Typically, this plate is obtained by cutting a slice in a bar formed of a multitude of fibre optics having a diameter of several micrometers and connected to each other via fusion of their sheathing material. Once the slice has been cut to the desired thickness, the contour of the slice is fitted to the desired shape, then the faces of the slice are polished and, Where necessary, one of the faces is shaped to obtain the desired shape, for example to obtain a glass of cylindrical convex, spherical convex or any other shape.

For a watch glass the typical thickness of the fibre optic beam plates used varies from 1 mm to 5 mm.

So that fibre optic glass 22 can transmit information situated in proximity to its bottom face 22a towards its top surface 22b in good conditions, i.e. so that the information that appears at top surface 22b is of acceptable clarity, the information to be transmitted via fibres 24 must be as close as possible to the bottom surface 22a of the glass. Typically, in this embodiment, the top surface of hands 10a and 10b is preferably situated between 50 and 250 μm from the bottom surface 22a. It will be noted in this regard that the hour symbols 26 are advantageously affixed directly onto the bottom surface 22a of the glass. The same is evidently true of any other decorative pattern or design that one wishes to show on top surface 22b of glass 22.

Via the convex shape of the outer surface 22b of glass 22 according to the invention, the observer can be given the impression that the watch has a convex dial and hands, here of cylindrical convex shape, giving the watch an original aesthetic appearance.

Figure 5:
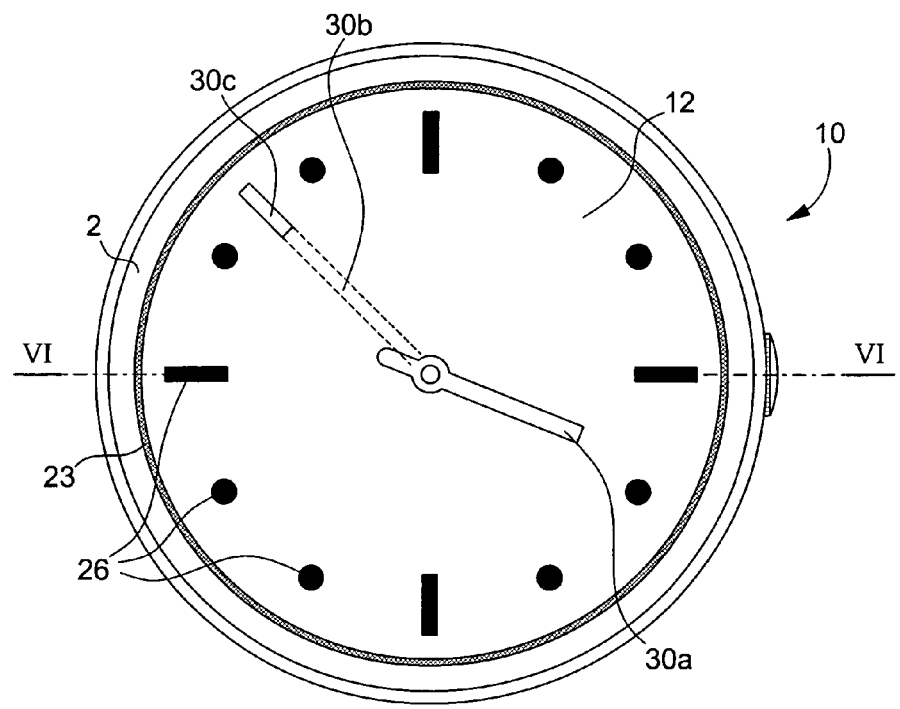
FIG. 5 shows in perspective a watch according to a variant of the first embodiment of the invention shown in FIG. 3.
Figure 6:
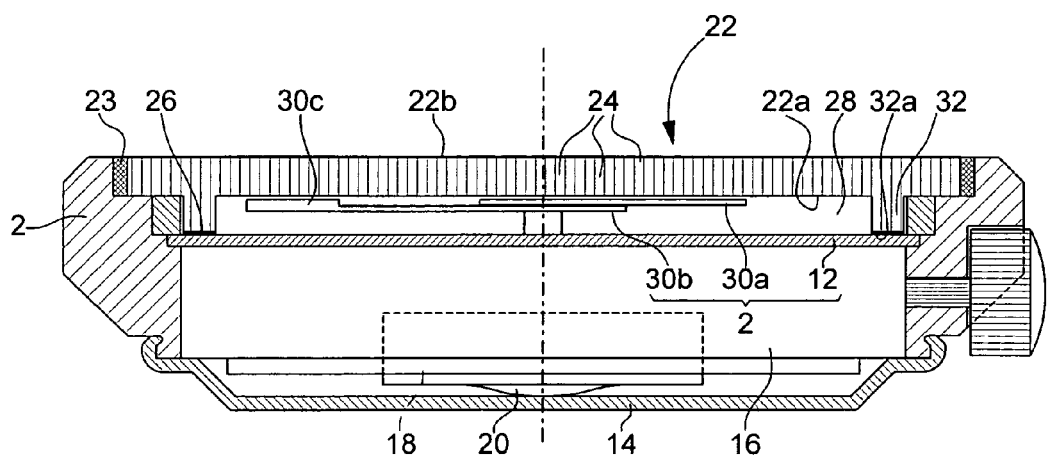
FIG. 6 shows a cross-section along the line VI-VI of the watch of FIG. 5.

FIGS. 5 and 6 show a variant of the watch according to the first embodiment of the invention. According to this variant, the outer surface 22b of the glass according to the invention is plane. However, inner surface 22a has central recess 28 in which hour hand 30a and minute hand 30b move. This central recess 28 is delimited by an annular rib 32 having an annular frontal surface 32a. Annular surface 32a is preferably in contact with the portion of the top surface of dial 12 comprising hour symbols 26 or other indications. It goes without saying that the annular surface can also extend in proximity to said portion of dial 12, preferably at a distance comprised between 50 and 250 μm from the dial.

In this variant, it will also be noted that the hour and minute hands 30a and 30b and the assembling thereof at the surface of the dial have been adapted with respect to a conventional analogue display. Indeed, in this variant, unlike a conventional assembly, hour hand 30a moves above minute hand 30b. Moreover, minute hand 30b includes at its free end a portion of surface 30c which extends in substantially the same plane or at the same level as the surface of hour hand 30a located opposite bottom surface 22a of glass 22. Thus, the two hands, respectively for the hours and minutes, can be brought to an equal distance from and in proximity to bottom surface 22a of glass 22 and further improve transmission of their image via fibre optics 24 onto top surface 22b of glass 22.

Figure 7:
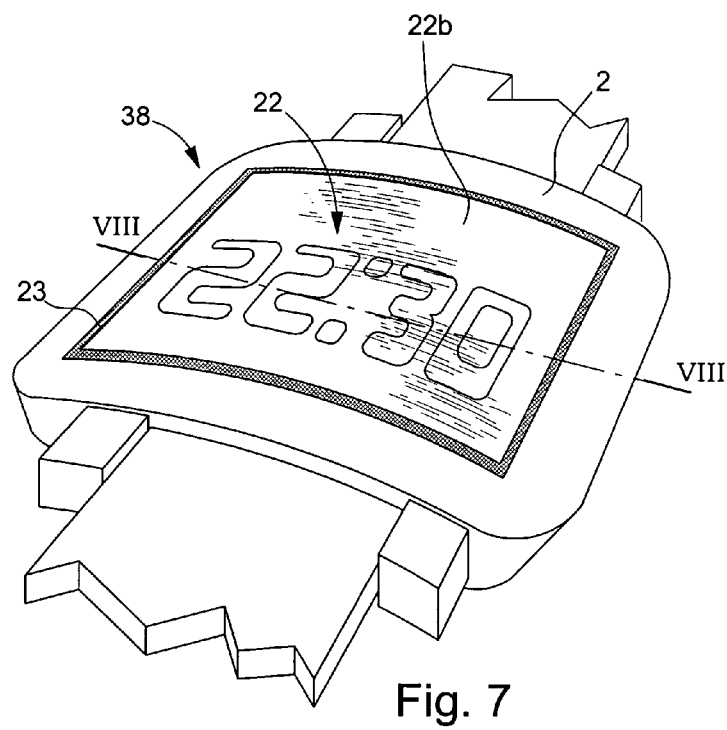
FIG. 7 shows in perspective a watch according to a second embodiment of the invention.
Figure 8:
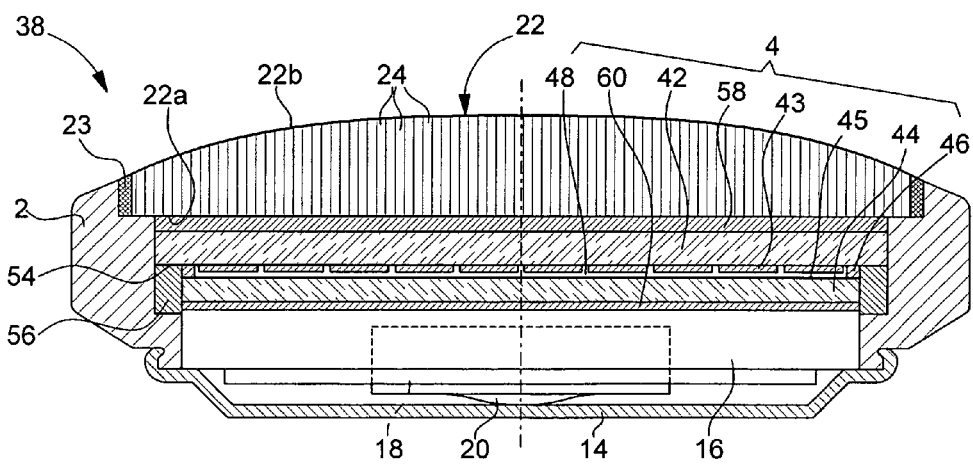
FIG. 8 shows a cross-section along the line VIII-VIII of the watch of FIG. 7.

FIGS. 7 and 8 show a second embodiment of a watch 38 according to the invention. Watch 38 according to this second embodiment of the invention differs from watch 10 according to the first embodiment of the invention essentially in that the protective glass 22 is associated with a digital display device 4. In the example illustrated, the display device is formed of a liquid crystal cell 4, for example of the twisted nematic (TN) type, which operates in reflection. It goes without saying that other types of digital display cells such as cholesteric type cells can be used.

The TN display cell 4 comprises a transparent top substrate 42, a back substrate 44 and a sealing frame 46 forming spacing and closing means delimiting, with substrates 42 and 44, a cavity in which there is located a liquid crystal film 48. The opposite faces of substrates 42 and 44 comprise transparent electrodes 43_and 45. In this example, top substrate 42 carries electrodes 43 configured in digits each formed of segments for displaying alphanumerical characters, whereas bottom substrate 44 carries one electrode 45 over its entire surface. Electrodes 43 and 45 are conventionally conected to control means (not shown) integrated in movement 16 via contact pads 54 and connectors 56 for supplying them with a control voltage. Cell 4 further includes, on glass 22 side, a linear polarizer 58 and on the movement side a reflector film 60

In order to obtain optimum optical transmission of the information displayed by the display cell towards the outer surface 22b of glass 22, care will be taken to reduce the distance between the image to be displayed and said outer surface 22b in the present case the distance between the liquid crystal film and said outer surface 22b. In order to do this, one will use a top substrate 42 and a polarizer that are as thin as possible. Typically, substrates made of plastic material will be preferred with which thickness of the order of 100 μm for cells having a surface area of the order of few cm² can be achieved. Likewise, a polarizer in the form of a film several μm thick will preferably be used, which can be deposited on top substrate 42 and preferably on the face directed towards the liquid crystal film of said substrate 42. The bottom surface 22a of glass 22 is of course arranged in close contact with the top substrate 42 to reduce as much as possible the distance between the image to be displayed and the outer surface 22b of glass 22.

Although the present invention has been described in relation to particular embodiments, it is, however, clear that it is not limited to said examples and that it is capable of having numerous variants and alterations without departing from its scope. Top surface 22b of glass 22 could advantageously include a protective scratchproof layer and/or be associated with an anti-reflective layer.

The invention can advantageously be applied to making a portable electronic instrument such as, a portable telephone including a case in which display means are arranged, associated with control means and electric powering means, radio-frequency signal reception and transmitting means. The display means are typically visible through an aperture arranged in the case and the aperture is closed by a protective plate formed of a fibre optic group.

What is claimed is:

1. A watch, comprising
a case fitted with a glass, and
mobile display means observable through the glass,
wherein said glass comprises a plate formed of a fiber optic group,
wherein the display means are of the analogue type and comprise an hour analog display means and a minute analog display means,
wherein the hour analog display means and the minute analog display means are coaxial,
wherein the hour analog display means moves above the minute analog display means,
wherein the minute analog display means has a first end portion comprising a first flat surface extending parallel to the plate, and
wherein the hour analog display means comprises at least a second portion having a second flat surface extending parallel to the plate and wherein the first and second surfaces are coplanar.

2. The watch according to claim 1, wherein fiber optics in the fiber optic group are arranged parallel to each other and extend perpendicularly to the display means.

3. The watch according to claim 1, wherein said glass has an external face of non plane shape.

4. The watch according to claim 1, wherein an outer face of said glass is spherical convex.

5. The watch according to claim 1, wherein an outer face of said glass is cylindrical convex.

6. The watch according to claim 1, wherein the distance between a bottom face of the glass and said display means comprises between 50 and 250 mm.

7. The watch according to claim 1, wherein the outer face of the fiber optic plate includes a protective scratchproof layer.

8. The watch according to claim 1, wherein the fiber optic plate comprises an outer face including an anti-reflective plate.

9. The watch according to claim 1, wherein symbols and/or designs are affixed to a bottom face of the fiber optic plate.

10. The watch according to claim 1 further including a dial, wherein the bottom face of the fiber optic plate has a central recess in which the
display means can move and through which the display means are observable, and
wherein said central recess is delimited by an annular surface extending in proximity to the dial or in contact therewith.

11. The watch according to claim 1, wherein the hour analog display means comprises an hour hand and wherein the minute analog display means comprises a minute hand.

12. A watch glass comprising an upper face and a bottom face,
wherein said watch glass includes a fiber optic plate made of optical fibers bundled together,
wherein the bottom face of the fiber optic plate has a central recess in which a display means can move, and
wherein the central recess is delimited by an annular flat surface perpendicular to the optical fibers of the plate.

13. The watch glass according to claim 12, wherein the upper face of said watch glass has a non plane shape.

14. The watch glass according to claim 12, wherein the upper face of said watch glass has a spherical convex shape.

15. The watch glass according to claim 12, wherein the upper face of said watch glass has a cylindrical convex shape.

16. The watch glass according to claim 12, wherein said watch glass has one face provided with a protective scratchproof layer.

17. The watch according to claim 12, wherein said watch glass has one face provided with an anti-reflective layer.

18. A watch glass comprising an upper face and a bottom face,
wherein said watch glass includes a fiber optic plate,
wherein the bottom face of the fiber optic plate has a central recess in which a display means can move, and
wherein the central recess is delimited by an annular surface, wherein the watch glass further comprises symbols, or designs, or symbols and designs, affixed to the bottom face of the fiber optic plate.

19. A watch glass comprising an upper face and a bottom face,
wherein said watch glass includes a fiber optic plate,
wherein the bottom face of the fiber optic plate has a central recess in which a display means can move, and
wherein the central recess is delimited by an annular surface, wherein the watch glass further comprises symbols, or designs, or symbols and designs, affixed on said annular surface.

* * * * *